D. MOISEEFF.
APPARATUS FOR DRIVING AND STEERING SHIPS AND FOR PROTECTING THEM AGAINST ENCOUNTERED FLOATING BODIES AND MINES.
APPLICATION FILED JAN. 26, 1917.

1,237,674.

Patented Aug. 21, 1917.

Inventor:
Dmitri Moiseeff
By Edson Bros.
Attorneys.

UNITED STATES PATENT OFFICE.

DMITRI MOISEEFF, OF PERM, RUSSIA.

APPARATUS FOR DRIVING AND STEERING SHIPS AND FOR PROTECTING THEM AGAINST ENCOUNTERED FLOATING BODIES AND MINES.

1,237,674.  Specification of Letters Patent.  Patented Aug. 21, 1917.

Application filed January 26, 1917. Serial No. 144,743.

*To all whom it may concern:*

Be it known that I, DMITRI MOISEEFF, a subject of the Czar of Russia, residing at Perm, in the Empire of Russia, have invented certain new and useful Improvements in Apparatus for Driving and Steering Ships and for Protecting Them Against Encountered Floating Bodies and Mines, of which the following is a specification.

This invention is an apparatus for driving and steering vessels, which has for its object to displace or remove a portion of the body of water from in front of the vessel by the action of the propelling means, which may be fluid under pressure, the apparatus serving also to protect the vessel against floating bodies, such as explosive mines, or other devices liable to injure the vessel. The apparatus embodies the novel structure which is designed to contact with floating bodies or foreign substances which are liable to injure the vessel, and to displace them out of the path of travel of the vessel. Instrumentalities of any approved type are designed to act with force upon the body of water to thereby displace the bow-wave coming to vessels moving with rapidity through the water, and in so doing facilitate the travel of the vessel through the body of water, the fluid under pressure serving by its contact with the body of water to propel the vessel. The device also includes mechanism whereby discharged fluid may be directed under the vessel, or into the body of water beneath a portion of the vessel, and this discharge of fluid may be controlled by manually operable means whereby the vessel may be steered or directed in its course, either in a forwardly direction or rearwardly direction.

An embodiment of the invention is disclosed in the accompanying drawing, wherein—

Figure 1:
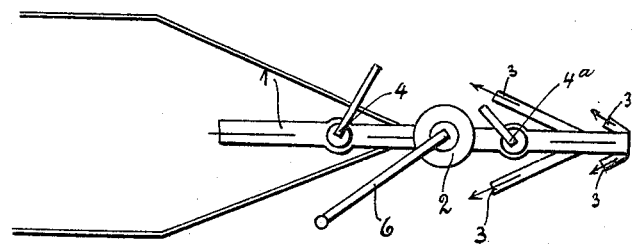
Figure 1 is a diagrammatic plan view disclosing the inventive idea.

Referring more particularly to the embodiment of the invention disclosed herein, the vessel is shown provided with a main conductor or pipe, indicated at 1, which may be connected with any suitable source of air or fluid compressing means (not shown). It is preferred to use compressed air in the system, although other substances may be employed, if found desirable. The main conductor is provided with a socket indicated at 2, and with a plurality of depending branch conductors each provided with a nozzle 3. Between the socket 2 and the branch conductors there may be employed a manually controlled valve 4 to control the supply of fluid passing through the branch conductors, and the entire supply of fluid may be controlled while passing through the main conductor or pipe 1 by a manually controlled valve $4^a$. In the drawings there is shown a branch conductor 5 rotatably mounted in the socket 2 of the main conductor or pipe 1, such branch conductor being provided with any suitable means, such as a handle 6 for rotating the conductor 5 in the socket 2. If desired this branch conductor 5 may be otherwise supported from the vessel. It is shown provided with a nozzle 7 of any approved form.

The nozzles 3 are preferably directed from the branch depending conductors at an angle of substantially 45 degrees to the plane of the vessel, and, as shown in Fig. 1, are projected to both sides of the vessel, so that fluid under pressure passing from the nozzles will displace some of the volume of water from in front of the vessel to facilitate the passage of the vessel through the water, owing to the pressure of fluid from the nozzles engaging the water in a downwardly rearwardly direction and at an angle to the path of the vessel through the water. The nozzle 7 is preferably positioned in alinement with the keel or bottom of the vessel to direct fluid under pressure below the bottom of the vessel and at an angle thereto. This nozzle may be fed through the slots in the pipe on the inside of the socket 2.

Figure 2:
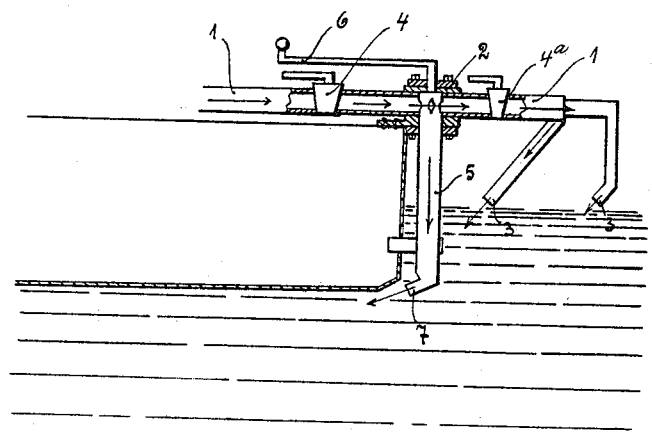
Fig. 2 is a side elevation disclosing the bow of the vessel and the apparatus applied thereto, in diagrammatic form.

When the valve $4^a$ in the main conductor or pipe 1 is opened and the valve 4 positioned between the socket 2 and branch conductors for nozzles 3 is closed, the fluid, such as compressed air, is directed through the branch conductor 5 and outer nozzle 7. As this nozzle is rotatably mounted relative to the vessel, the fluid may be so directed that it can drive the vessel straight ahead by injecting the compressed fluid into the water in alinement with the keel of the vessel, or the vessel can be reversed or propelled rearwardly by directing the nozzle in an opposite direction to the keel of the vessel. It is obvious also that turning movements of the vessel may be accomplished by various manipulations of the handle 6 or other controlled mechanism for differently positioning the nozzle 7. The various nozzles 3 are preferably arranged in pairs to inject fluid into the water to opposite sides of a medial line of the vessel, and these nozzles 3 are preferably stationary. When it is desired to propel the vessel at high speed and relieve it of the bow-wave coming to vessels moving at high speed the valve 4 may be opened to permit fluid under pressure to pass through the nozzles 3 in addition to the fluid passing through the nozzle 7. This permits the displacement of the water rearwardly to both sides parallel to the outline of the prow of the vessel's hull so that two oblong depressions are formed in the water in advance of the bow of the vessel, these two depressions being afterward transformed into one common depression in front of the vessel and in which the vessel enters. It is obvious that any number of branch conductors with nozzles may be employed, depending upon the width and draft of the vessel, but it is preferred to employ the stationary nozzles 3 in pairs arranged as illustrated in Figs. 1 and 2.

By this arrangement of the propelling, steering and protecting mechanism of the vessel the parts may be easily installed, and its accessibility for inspection and repair during navigation facilitated. This adaptation of propelling and protecting mechanism also permits the hull to remain in a solid state without requiring perforations for driving shafts which must be packed to prevent the ingress of water. Furthermore the arrangement of nozzles and branch nozzles herein disclosed prevents the retardation of the movement of the vessel due to seaweed and also attains an important result in securing increased speed, easy and quick manipulation or veering of the vessel during its travel, and in addition thereto protects the vessel from contact with floating bodies liable to injure the same, such as mines, torpedoes and the like.

What I claim is:

1. In a device of the character described, the combination with a vessel, of fluid discharging instrumentalities positioned in advance of the bow of the vessel, said instrumentalities including a discharge nozzle positioned at an angle to the longitudinal axis of the vessel, said nozzle being arranged to discharge fluid in advance of the bow of the vessel and substantially in a direction of travel of the vessel, and means to forcibly discharge fluid through the nozzle to displace water from in front of the vessel and to propel the vessel.

2. In a device of the class described, the combination of a vessel, of fluid discharging instrumentalities carried by the vessel and provided with a plurality of discharge nozzles, some of said nozzles being arranged in pairs in advance of the bow of the vessel and at an angle to the longitudinal axis of the vessel, and means to force a fluid substance through said nozzles to displace some of the water in advance of the vessel and at the same time propel the vessel.

3. In a device of the class described, the combination with a vessel, of a plurality of fluid discharging nozzles positioned in advance of the bow of the vessel, means to supply fluid under pressure to said nozzles, one of said nozzles being arranged in juxtaposition to the bow of the vessel and operating to discharge fluid substantially under the vessel, means to control the passage of fluid through said nozzle, and other discharging nozzles arranged in pairs in advance of said bow nozzle and operating to displace some of the water in advance of the bow of the vessel, and means to control the passage of fluid through said advance nozzles, said fluid discharge operating to displace some of the body of water from in front of the vessel and also to propel the vessel.

4. In a device of the class described, the combination with a vessel, of a fluid conductor, means to supply fluid under pressure through said conductor, a plurality of depending branch conductors each having a discharge nozzle positioned at an angle to the longitudinal axis of the vessel to discharge fluid in advance of the bow of the vessel and to thereby displace some of the body of water from in front of the vessel, some of said nozzles being arranged in pairs to simultaneously discharge fluid downwardly and rearwardly and also on opposite sides of a medial line through the vessel to thereby remove a portion of the body of water in advance of the bow of the vessel and at the same time to propel the vessel through the water.

5. In a device of the class described, the combination with a vessel, of a main fluid conductor, means to supply fluid under pressure through said conductor, a plurality of branch conductors having nozzles to inject fluid under pressure into the body of water in advance of the vessel, and a plurality of control valves in the main fluid conductor to control the passage of fluid through the several branch conductors.

6. In a device of the class described, the combination with a vessel, of a main fluid conductor, means to supply fluid under pressure through said conductor, a plurality of branch conductors having nozzles, valves to control the passage of fluid through different branch conductors to the various nozzles, one fluid conductor and its nozzle being rotatably mounted relative to the vessel, and means to control the rotation of said conductor and nozzle whereby the direction of movement of the vessel may be varied.

7. In a device of the class described, the combination with a vessel, of a main fluid conductor, means to supply fluid under pressure through said conductor, a plurality of branch conductors having nozzles to inject fluid under pressure into the body of water in advance of the vessel, one of said branch conductors being pivotally mounted with relation to the main conductor and having means whereby fluid may be discharged at various angles relative to the bow of the vessel, and a plurality of stationary nozzles arranged in pairs in advance of the pivotal branch conductor to remove the bow-wave from in front of the vessel substantially equal to the width and draft of the vessel, said pairs of nozzles serving also as a fender to engage foreign bodies carried by the water and to deflect such foreign bodies away from the bow of the vessel.

8. In a device of the class described, the combination with a vessel, of a main fluid conductor having a plurality of branches depending from the main conductor, branch conductors being arranged in advance of the vessel and to extend into the water laterally from the medial line of the main conductor, and means to supply fluid under pressure through said conductors to displace some of the water from in front of the vessel and also to protect the vessel from contact with foreign bodies carried by the water by swerving such foreign bodies out of the path of travel of the vessel.

In witness whereof I have hereunto set my hand in presence of two witnesses.

DMITRI MOISEEFF.

Witnesses:
H. A. LOVIAGUINE,
R. LOVIAGHIN.

Copies of this patent may be obtained for five cents each, by addressing the "Commissioner of Patents, Washington, D. C."